(12) United States Patent
Horn et al.

(10) Patent No.: US 8,550,767 B2
(45) Date of Patent: Oct. 8, 2013

(54) CLOSED-LOOP CONTROL FOR A GAS TURBINE WITH ACTIVELY STABILIZED COMPRESSOR

(75) Inventors: Wolfgang Horn, Munich (DE);
Klaus-Juergen Schmidt, Munich (DE)

(73) Assignee: MTU Aero Engines GmbH, Munich (DE)

( * ) Notice: Subject to any disclaimer, the term of this patent is extended or adjusted under 35 U.S.C. 154(b) by 748 days.

(21) Appl. No.: 12/671,489

(22) PCT Filed: Jul. 17, 2008

(86) PCT No.: PCT/DE2008/001176
§ 371 (c)(1),
(2), (4) Date: Jan. 29, 2010

(87) PCT Pub. No.: WO2009/015635
PCT Pub. Date: May 2, 2009

(65) Prior Publication Data
US 2010/0196137 A1    Aug. 5, 2010

(30) Foreign Application Priority Data

Jul. 31, 2007   (DE) .......................... 10 2007 035 927

(51) Int. Cl.
*F01D 11/24*   (2006.01)
*F04D 27/02*   (2006.01)

(52) U.S. Cl.
USPC ........ 415/1; 415/14; 415/16; 415/17; 415/19; 415/126; 415/127; 415/173.1; 415/173.2

(58) Field of Classification Search
USPC .......... 415/1, 14, 16, 17, 19, 126, 127, 173.1, 415/173.2
See application file for complete search history.

(56) References Cited

U.S. PATENT DOCUMENTS

| | | | | |
|---|---|---|---|---|
| 3,227,418 A * | 1/1966 | West | ............... | 415/127 |
| 3,901,620 A | 8/1975 | Boyce | | |
| 5,263,816 A * | 11/1993 | Weimer et al. | ................ | 415/131 |
| 5,431,533 A | 7/1995 | Hobbs | | |
| 6,543,992 B2 * | 4/2003 | Webster | .......................... | 415/10 |
| 6,626,635 B1 * | 9/2003 | Prowse et al. | ...................... | 415/1 |
| 6,692,222 B2 * | 2/2004 | Prinz et al. | ...................... | 415/14 |
| 2001/0001845 A1 * | 5/2001 | Khalid et al. | .................. | 701/100 |
| 2005/0149274 A1 * | 7/2005 | Finnigan et al. | ................ | 702/33 |

FOREIGN PATENT DOCUMENTS

| | | |
|---|---|---|
| DE | 10 2005 045 255 A1 | 3/2007 |
| EP | 1 550 791 A2 | 7/2005 |
| GB | 2 363 864 B | 1/2002 |

* cited by examiner

*Primary Examiner* — Igor Kershteyn

(57) ABSTRACT

A regulating system for a gas turbine, in particular an aircraft engine, has devices for blade-tip injection for increasing the compressor stability, these devices being activated as needed. The regulating system has devices for active clearance control, preferably in the high-pressure compressor, with which the radial clearance in the high-pressure compressor is kept in an optimum operating range, and the regulating system has a shared engine regulator for both devices. The technical problems of the prior art are avoided through the present invention, and an improved regulating system for a gas turbine, in particular an aircraft engine, is made available for active stabilization of the compressor.

10 Claims, 5 Drawing Sheets

CLOSED-LOOP CONTROL FOR A GAS TURBINE WITH ACTIVELY STABILIZED COMPRESSOR

This application claims the priority of International Application No. PCT/DE2008/001176, filed Jul. 17, 2008, and German Patent Document No. 10 2007 035 927.8, filed Jul. 31, 2007, the disclosures of which are expressly incorporated by reference herein.

BACKGROUND AND SUMMARY OF THE INVENTION

The invention relates to a regulating system for a gas turbine, in particular an aircraft engine, such that the regulating system has devices for blade-tip injection (ASC, active surge control) to increase compressor stability and devices for active clearance control (ACC), preferably in the high-pressure compressor. Furthermore, the invention relates to a method for regulation of a gas turbine, in particular an aircraft engine.

The reserve stability of compressors in gas turbine engines is crucial for safe operation of the engine. A stall in the compressor components of the engine leads to engine pumping and may result in loss of the aircraft. Such an event must therefore be prevented through appropriate measures with an extremely high reliability.

The front stages of high-pressure compressors in gas turbine engines operate in the lower load range in general and/or close to their stability limit, in particular at the start of acceleration, and are therefore the stability-determining factors for the entire compressor. When using blade-tip injection, it is assumed in general that when the onset of an instability is detected in the engine, injection is activated by supplying high-energy air from the rear compressor stages by recirculation through the front compressor stages, which operate at the stability limit, and/or to the stages of the low-pressure compressor, thereby stabilizing them. This is based essentially on a pressure measurement, which activates the injection with the help of a special algorithm via the engine regulator when a pressure fluctuation is detected in the compressor. This procedure takes place within a few milliseconds up to a few 100 ms.

However, a fundamental requirement on the part of authorities and/or the cell manufacturers is that in the response of the recirculation, there must not be any delay in the thrust response and in particular a so-called "thrust hole" must not occur in the engine. Thus, based on physical principles derived from the operating performance of the overall engine system, but also for reasons of reliability of such a highly sensitive pressure measurement designed for detection of high frequencies, such an approach will not be successful in all operating cases. A compressor system that already operates at the edge of the stability limit is briefly subjected to an even greater load and is pushed to the stability limit by withdrawal of air and the need to maintain thrust or to ensure the response performance in order to prevent a thrust hole. This is based essentially on the fact that the air throughput through the engine, which is then suddenly reduced, must be compensated by a rapidly elevated fuel supply accordingly. This causes higher turbine temperatures and higher operating points in the characteristics map of the compressor and thus a smaller stability interval. This technical problem can be solved only by equipping the engine regulator with a so-called "anticipation logic," so the injection has already been triggered and sufficient reserve stability is established even before the presumed onset of an instability.

Furthermore, the rear stages of high-pressure compressors generally operate close to their stability limit in the upper load range and therefore are the stability-determining factor for the entire compressor. The greatest drop in reserve stability usually occurs when the slightly preheated engine is accelerated to a high performance level and/or is accelerated again during flight after a lengthy stay at a low load stage. Due to the great difference in time constants in the thermal expansion of the casing and rotating components, this temporarily results in very great radial clearances between the rotating blades and the casing. This leads to a transient loss of reserve stability of the compressor, which can be prevented by actively adjustable and/or readjustable casing parts. The adjustment may be accomplished here through mechanical, thermal or other known forms of influence. The adjustment is triggered on the basis of a clearance, which is measured continuously during operation of the engine and exceeds its tolerance range, so it must be readjusted, or on the basis of a measured pressure fluctuation, which suggests the onset of instability in the compressor and prompts a reduction in clearance via an algorithm. Both variants rely on sensitive sensor systems, which in many cases are inadequate to meet the demands of rough engine operation and can lead to increased maintenance costs and production disturbances.

The products currently approved and available on the market use operational bleeding, adjustment guide vanes and temporary throttling of the fuel supply, either individually or in combination, for active stabilization of their compression systems. However, these intervention measures are performed only in response to an instability in the engine that has already occurred and has been detected by the regulating system through the measurement technology and is associated with a substantial loss of thrust. Existing compression systems are therefore designed with a high reserve stability accordingly, so the risk of pumping and thus the risk of unwanted loss of thrust are extremely minor.

In addition, various approaches involving injection for stabilization of the compressor are known. However, the proposed systems use essentially corresponding sensors to detect an instability with the help of an algorithm and only then do they respond. Such a system usually fails when the sensor system, which must also meet very high demands for reliability, response time and resolution, is not fast enough.

The situation is similar with regard to influencing the clearance in engines during operation. At the present time, only the radial clearances in the high-pressure compressor are reduced during flight by cooling the casing to achieve better efficiency and thus reduce fuel consumption. In numerous approaches that have been proposed, regulation of the clearance during operation of the engine has been proposed, but the clearance is also always measured and readjusted there.

The use of a highly sensitive sensor system for measuring the pressure characteristic in the compressor and the clearances increases not only the cost of the engine but also the cost of maintenance, while reducing reliability in operation. If the sensor system is not designed to be very extensive and with redundancy and is therefore expensive, a failure of the measurement technology can rapidly also lead to failure of the entire engine.

Therefore, the object of the invention is to avoid the aforementioned technical problems associated with the prior art and to make available an improved regulating system for a gas turbine engine of an aircraft for active stabilization of the compressor.

The inventive regulating system for a gas turbine engine of an aircraft has devices for blade-tip injection (ASC, active surge control) which are activated as needed to enhance compressor stability. The regulating system is characterized in that it has devices for active clearance control (ACC), preferably in the high-pressure compressor, so that the radial clearance in the high-pressure compressor is kept in an optimum operating range, and the regulating system has a shared engine regulator for both devices (ASC, ACC).

The technical problems of the prior art are avoided through the present invention, and an improved regulating system for a gas turbine engine of an aircraft for actively stabilizing the compressor is made available.

A combination of recirculation in the front stages and actively influencing the clearance in the rear stages is used in engine compressors. The advantages of both stabilizing methods are fully utilized in this way, and the compressor may be designed with a lower design pump limit from the beginning. The inventive approach may be combined with passive stabilization measures (e.g., casing treatment). The compressor may also advantageously be designed with a lower pump limit in this way accordingly. According to the present invention, the use of active, regulated stabilization measures is not limited to the high-pressure compressor but instead is based on any compressor in the engine, i.e., including the low-pressure compressor.

Suitable algorithms are used in the engine regulator to utilize the possibilities of both systems, i.e., active clearance regulation and blade-tip injection, both in the individual application and in combination.

According to the invention, recirculation is activated only temporarily as soon as additionally implemented regulatory principles detect a critical acceleration and/or deceleration maneuver, which is imminent and/or is already being implemented, and in which predefined threshold values are exceeded. In other words, a critical state is detected, where the compressor requires a greater reserve stability. The following parameters are accessed individually and/or in combination in a special algorithm, to implement an anticipation and/or to be able to implement a response in the engine control:
  the change and/or rate of change in the thrust lever control signal;
  the change and/or rate of change in the shaft rotational speed;
  the "command signal" of the "rating parameter" and/or the change therein;
  the change and/or rate of change in fuel throughput;
  the inlet pressure and temperature and/or outlet pressure and temperature of the engine and/or compressor;
  parameters from the ratio of fuel throughput to final compressor pressure;
  the turbine and/or exhaust gas temperature of the engine;
  and all other parameters that might be measured or synthesized and/or derived therefrom.

Another critical maneuver may additionally be anticipated for the low-pressure compressor in particular, and recirculation may additionally be activated by transfer of suitable parameters from the aircraft cell, such as the setting angle of the aircraft and/or the rate of change in the setting angle, munitions firing, etc.

As soon as the values again drop below certain predefined limits or critical limits are exceeded, the injection valves are closed again and the steady state is restored.

In addition, the control may also be coupled to any type of regulation of the system based on measurement signals. It is important here to create the smallest possible dead volume between the final control elements and the injection site in the system design in order to minimize dead time. According to an advantageous embodiment of the invention, a suitably dimensioned storage volume may be provided near the injection site, so that sufficient volume is available close to the injection site as needed without any significant feedback effect on the pressure situation at the removal site in the gas path.

Another advantageous embodiment of the invention may be to couple the anticipation logic with a predictive model of the pump limit interval implemented in the engine regulator or with a logic that anticipates the aging of the engine.

The casing adjustment mechanism is controlled according to the invention via additionally implemented regulatory principles, such that the radial clearances in the high-pressure compressor are always kept in the optimal range during operation of the engine.

To increase the quality of regulation, clearance sensors may advantageously be used, sending the clearance signal as a feedback signal back to the regulator. Regulation of the clearance thus ensures adequate stability of the compressor continuously.

A simplified clearance model having the following properties is therefore used:
  the centrifugal expansion of the rotor is taken into account;
  the instantaneous thermal expansion of the rotor and casing is taken into account;
  the thermal expansion to be expected in the near future is predicted;
  this algorithm is coupled to a logic characterizing the thermal history of the engine;
  there is coupling to a logic, which detects, evaluates and anticipates aging (operating time and/or cycle counter and/or gas temperatures).

To do so, the following parameters, which are usually already being recorded in the engine regulator and used to regulate the engine, are accessed individually or in combination:
  the change and/or rate of change in the thrust lever control signal;
  the change and/or rate of change in the shaft rotational speed;
  the command signal of the rating parameter and/or the change therein;
  the change and/or rate of change in the fuel throughput;
  the inlet and/or outlet pressure and temperature of the engine and/or of the compressor;
  the parameter from the ratio of fuel throughput to the final compressor pressure;
  the turbine temperature and/or the exhaust gas temperature of the engine;
and all other parameters that may have been measured or synthesized and/or derived therefrom.

In addition, by transmission of suitable parameters from the aircraft cell, such as g load and/or rate of change in g load, the logic may be further optimized, in particular for highly agile tactical aircraft.

Electronic regulators today allow limited volumes of data to be recorded over time and complex computation operations to be performed. This is utilized in the present invention to map the thermal history of the engine and to provide appropriate input for the clearance model.

Coupling the sensor system to the clearance model offers a greater precision in the radial clearance setting and provides redundancy in the event of failure of a part and/or the entire measurement technology.

The inventive method for regulating a gas turbine engine of an aircraft includes the following steps:
  controlling a casing adjustment mechanism according to the current flight status for adjustment of the clearance of the high-pressure compressor;

additionally measuring the clearance and comparing the actual value with the target value;

detecting critical acceleration and/or deceleration maneuvers and activating blade-tip injection.

The clearance is adjusted and regulated through special algorithms as a function of clearance measurements performed in the engine during operation. The actual setting of the clearance may be performed here by mechanical or thermal influence and/or also by using special materials such as shape memory alloys. In addition, clearance models are used in the regulation for validation of the measurement signals, i.e., for comparison of the actual values with the target values and as back-up and/or to increase redundancy in the event of failure of the measurement technology. The clearance models may include algorithms for calculation of centrifugal expansion, thermal expansion and the change in clearance due to aging and/or under g load. Model-based regulating methods are thus combined with methods in which the clearance is measured during operation. The clearance measurement should serve as back-up for validation of the model-based method.

As an excellent advantage, the combination of recirculation and active clearance control in a compressor allows extensive elimination of operational bleeding and readjustment guide vanes. These tasks are performed at partial load and in particular in the low partial-load range (start-up) through recirculation. Thus, the complexity, cost and weight are reduced, while reliability is increased because the advantages of the new system are predominant.

Through the present invention, the compressor components may be designed from the beginning with less reserve stability over the entire load range and their efficiency may be further increased thereby and/or weight eliminated through optimized design.

Another advantage of the invention is that it does not require additional expensive and sensitive instrumentation, which would have a negative effect on reliability, manufacturing costs and maintenance costs. Essentially the existing instrumentation for engine operation is used.

In addition, the present invention may also be combined with measurement technology for pressure and clearances and would therefore supply the redundancy required for a sensitive measurement technology. The operational reliability of engines would be increased accordingly and a smaller safety margin would be required in the design of the stability limit of the compressor.

Furthermore, the inventive approach is suitable for inexpensive retrofitting of existing engines.

Engines in the development stage may be designed either with a higher efficiency and a higher pressure ratio or less expensively in an optimized design thanks to the present invention. Alternatively, the reserve pump limit thereby obtained may be exchanged for an increased reserve for exacerbation of engine/compressor operation or improved engine dynamics.

Engines to be developed in the future may be designed from the beginning with lower pump limit intervals thanks to the present invention and therefore a higher design efficiency may be achieved and/or more degrees of freedom in the design may be acquired.

Additional measures to improve the present invention are explained in greater detail below, together with the description of a preferred exemplary embodiment of the invention on the basis of the figures.

DETAILED DESCRIPTION OF THE DRAWINGS

Figure 1:
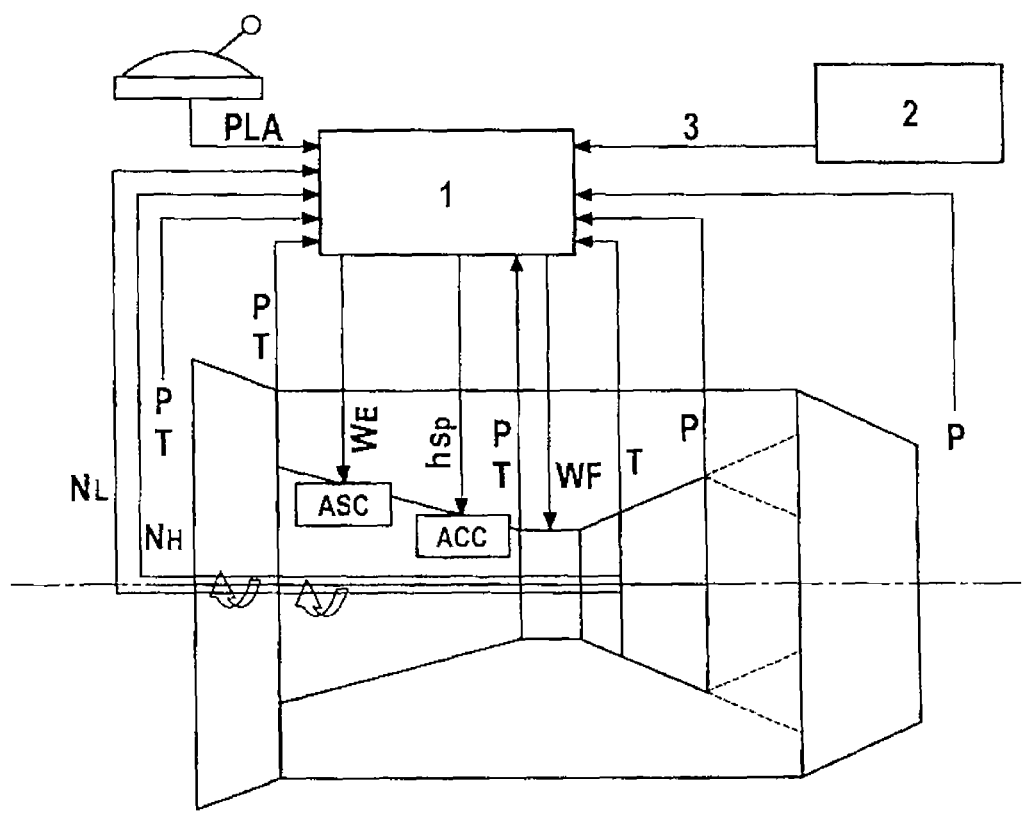
FIG. 1 shows a schematic diagram of an inventive regulating system for a gas turbine having an actively stabilized compressor.

FIG. 1 shows a schematic diagram of an inventive regulating system for a gas turbine having an actively stabilized compressor. This shows that the engine data detected for the general engine control, such as temperatures T, pressures P, rotational speed measurements NL, NH and thrust lever setting PLA also form the input parameters for the engine regulator 1 of the inventive regulating system. In addition, data from aircraft avionics 2 indicating the flight position and flight maneuver 3 may also be used. Using these parameters already detected in the prior art, the algorithms stored in the inventive regulating system, the clearance model and the anticipation logic are acted upon. The corresponding devices on the compressor are controlled through appropriate control signals $W_E$ for the blade-tip injection ASC (active surge control) and $hs_p$ for clearance control ACC (active clearance control). Control of fuel injection WF should be mentioned only marginally.

Figure 2:
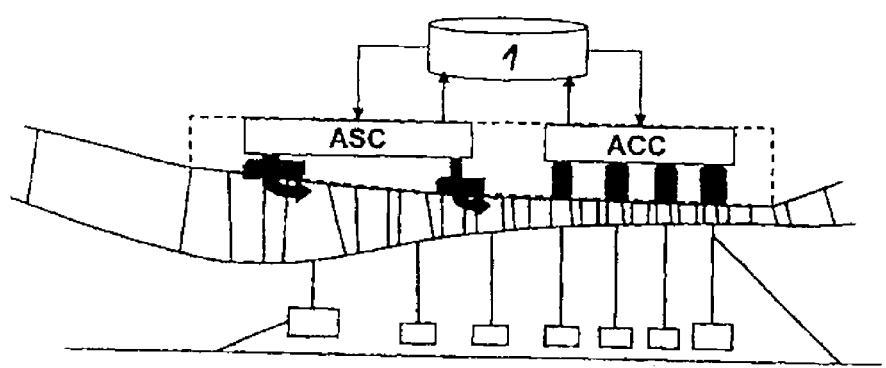
FIG. 2 shows a schematic diagram of a high-pressure compressor with combined active pump regulation and active casing adjustment.

FIG. 2 shows a schematic diagram of a high-pressure compressor having combined active pump regulation (ASC) through injection/recirculation and active casing adjustment (ACC) for clearance regulation. The corresponding devices ASC and ACC are controlled by an engine regulator 1, as described in FIG. 1. The ASC and ACC systems may be mounted at any desired location in the compressor.

Figure 3:
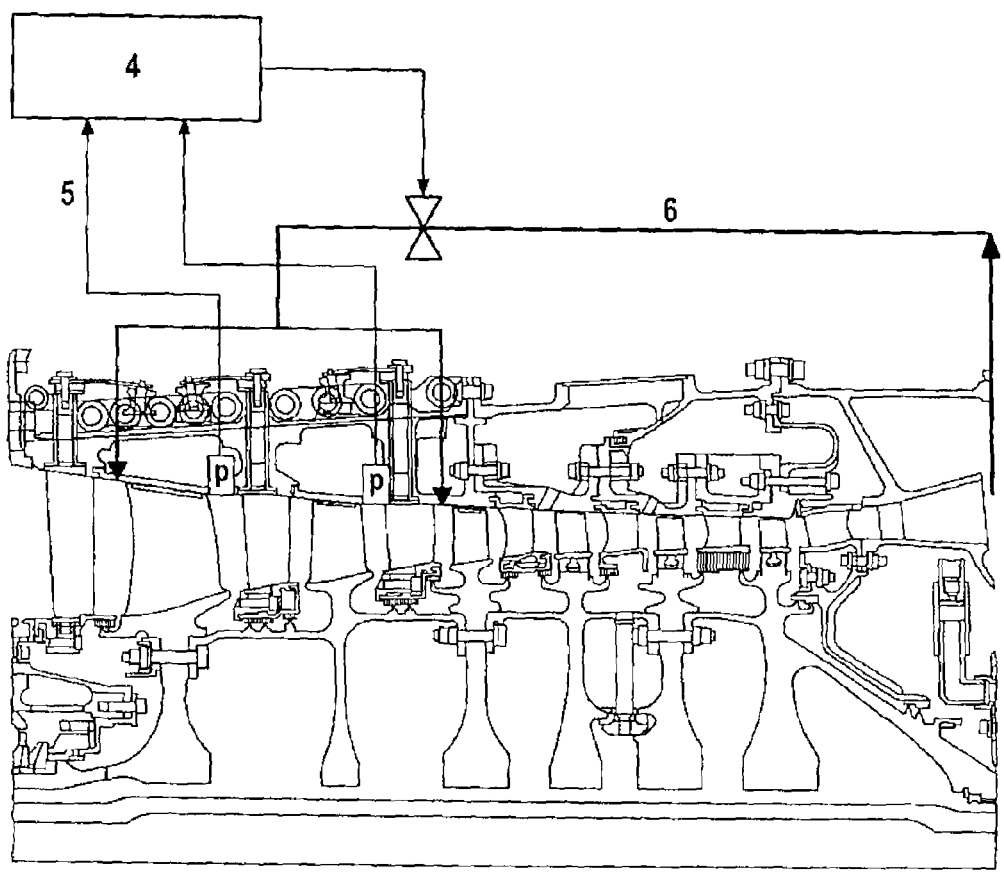
FIG. 3 shows a schematic diagram as an example of active stabilization through blade-tip injection.

FIG. 3 shows a schematic diagram as an example of active stabilization by blade-tip injection. A regulator 4, which may be part of the engine regulator, is acted upon here by corresponding measured pressure values 5. On the basis of the measured pressure values, but especially the anticipation logic, which anticipates operating states close to the stability limit of the low-pressure compressor, the regulator 4 responds by temporary recirculation 6 of compressed air into the blade tips of the front compressor stages. The positions of air withdrawal and injection are selected according to the compressor tuning.

Figure 4:
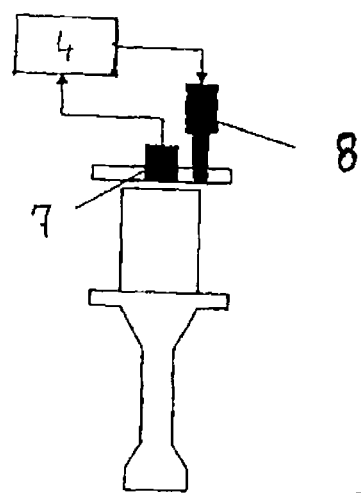
FIG. 4 shows a schematic diagram as an example of the design of active clearance regulation.

FIG. 4 shows a schematic diagram as an example of the design of an active clearance regulation. The regulator 4 detects measured values of the clearance measurement 7 and equalizes them using a clearance model stored in the memory. As the result, a clearance adjustment 8 is triggered, so the blade-tip clearance in the high-pressure compressor is optimal in any operating state.

Figure 5:
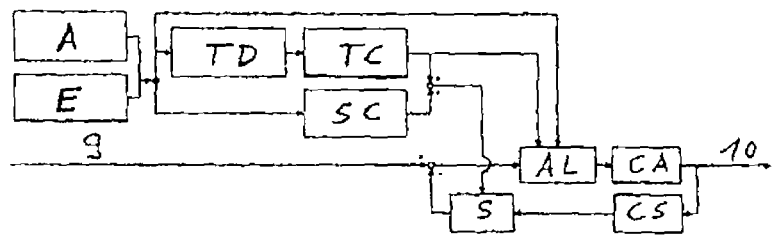
FIG. 5 shows a regulation scheme for active clearance control.

FIG. 5 shows a regulating scheme for the active clearance control, where A denotes aircraft data: PLA, flight mode, Mn, α, G load, . . . ; where E denotes drive data: N, T2, T25, T3, EPR, . . . ; where TD denotes the transient detection: |dN/dt|>threshold value; t<threshold value; where TC denotes the transient clearance model: s=f(t, Q); where SC denotes a steady-state clearance model: s=f(N, T25); where AL denotes an anticipation logic; where CA denotes the clearance actuator, CS denotes the clearance sensor and S denotes signal detection. Due to the closed regulating system, the target value, i.e., the minimum clearance 9, is compared with the actual value, i.e., the actual clearance.

Figure 6:
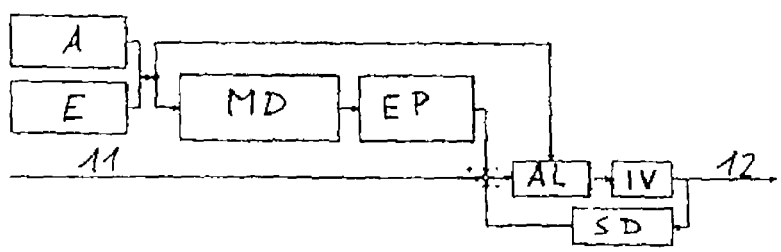
FIG. 6 shows a regulation scheme for active stability control through blade-tip injection.

FIG. 6 shows a regulation scheme for active stability regulation by blade-tip injection, where A denotes aircraft data: PLA, flight mode, Mn, α, G load, . . . ; E denotes drive data: N, T2, T25, T3, EPR, . . . ; MD denotes critical maneuver detection: dN/dt>threshold value; P3/P25-SL<threshold value: t<threshold value; EP denotes drive protection log: N2C>threshold value; EGT>threshold value; IV denotes injection valve and SD denotes flow separation detection/pump detection. Here again, a closed regulation circuit is provided for comparison of the target value, i.e., the target compressor stability, with the actual value, i.e., the actual stability.

The implementation of the present invention is not limited to the preferred exemplary embodiment described above. Instead, a number of variants, which make use of the approach presented in the claims in different embodiments, are also conceivable.

The invention claimed is:

1. A regulating system for a gas turbine, comprising:
    devices for blade-tip injection which enhance a stability of a compressor and which are activated as needed;
    devices for active clearance control in the compressor, with which a radial clearance in the compressor is kept in an optimum operating range; and
    a joint engine regulator for the devices for blade-tip injection and active clearance control.

2. The regulating system for a gas turbine according to claim 1, wherein the regulating system has an anticipation logic.

3. The regulating system for a gas turbine according to claim 1, wherein a predictive model is provided for a pump limit interval.

4. The regulating system for a gas turbine according to claim 1, further comprising a storage reservoir for compressed air near an injection site for the blade-tip injection to prevent dead times.

5. The regulating system for a gas turbine according to claim 1, further comprising casing parts which are adjustable mechanically, electrically, pneumatically, hydraulically and/or thermally for clearance control.

6. The regulating system for a gas turbine according to claim 1, further comprising sensors for a clearance measurement.

7. The regulating system for a gas turbine according to claim 1, wherein a clearance model algorithm is provided for regulating a clearance height and validating measurement signals.

8. A method for regulating a gas turbine, comprising the steps of:
    controlling a casing adjustment mechanism according to a current flight status for adjusting a clearance height of at least one compressor;
    additionally measuring the clearance height and comparing an actual value with a target value; and
    detecting critical acceleration and/or deceleration maneuvers and activating a blade-tip injection as needed.

9. The method for regulating a gas turbine according to claim 8, further comprising additionally processing suitable parameters of an aircraft cell for anticipation and detection of critical maneuvers.

10. The method for regulating a gas turbine according to claim 8, wherein anticipation logic is coupled to a predictive model of a pump limit interval.

* * * * *